United States Patent [19]

Tatsukami et al.

[11] Patent Number: 4,758,067
[45] Date of Patent: Jul. 19, 1988

[54] PLASTIC OPTICAL FIBER

[75] Inventors: Yoshiharu Tatsukami; Katsuramaru Fujita; Motonobu Furuta, all of Osaka; Toshifumi Tamura, Shiga, all of Japan

[73] Assignee: Sumitomo Chemical Co., Ltd., Osaka, Japan

[21] Appl. No.: 737,412

[22] Filed: May 24, 1985

[30] Foreign Application Priority Data

May 25, 1984 [JP] Japan ................... 59-107326

[51] Int. Cl.⁴ ............................................. G02B 6/00
[52] U.S. Cl. ........................ 350/96.34; 350/96.30; 428/373; 428/394
[58] Field of Search .............. 428/375, 373, 374, 421, 428/394; 350/96.30, 96.34, 96.31; 526/245

[56] References Cited

U.S. PATENT DOCUMENTS 4,259,407  3/1981  Tada et al. ................... 526/245
4,576,438  3/1986  Tatsukami et al. ............ 428/394
4,615,584  10/1986 Ohmori et al. ................ 350/96.34

FOREIGN PATENT DOCUMENTS 0097325  1/1984  European Pat. Off. .
0103761  3/1984  European Pat. Off. .

OTHER PUBLICATIONS

Patent Abstracts of Japan, vol. 6, No. 145, Aug. 4, 1982, "Light Transmission Body Made of Synthetic Resin".

*Primary Examiner*—Lorraine T. Kendell
*Attorney, Agent, or Firm*—Birch, Stewart, Kolasch & Birch

[57] ABSTRACT

A plastic optical fiber comprising a core and a cladding, wherein the core is made a polymer comprising units of methyl methacrylate and of a methacrylate ester, the ester moiety of which has an alicyclic hydrocarbon of 8 to 20 carbon atoms, and the cladding is made of a fluorine-containing polymer comprising units of the formula:

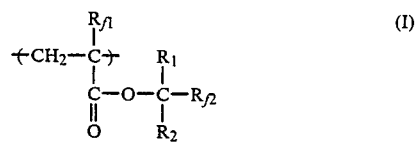

wherein $R_1$ and $R_2$ are each hydrogen or $C_1$–$C_3$ alkyl, $R_{f1}$ is fluorine or trifluoromethyl, an $R_{f2}$ is $C_2$–$C_{10}$ fluoroalkyl, which units (I) are derived from fluoroalkyl α-fluoroacrylate or trifluoromethacrylate, which has short- and long-time heat and humidity resistance as well as low attenuation of light transmission.

13 Claims, No Drawings

PLASTIC OPTICAL FIBER

FIELD OF THE INVENTION

The present invention relates to a plastic optical fiber. More particularly, it relates to a plastic optical fiber comprising a core and a cladding with improved heat and humidity resistance.

BACKGROUND OF THE INVENTION

Conventional optical fibers are made from glass materials and widely used as optical signal-transmitting mediums for instrumentation between instruments or in an instrument, for transmission of data, for medical use, for decoration, for transmission of image, etc. However, they are poor in flexibility when their diameters are not small enough. Further, they are relatively fragile and are apt to be broken by impact. Furthermore, they are heavy, because their specific gravity is comparatively large. In addition, the optical fibers themselves as well as their connectors are expensive. Due to these drawbacks, attempt has been made to replace glass materials with plastic materials.

The advantages with plastic materials are numerous. For instance, the resulting optical fibers are light, tough and flexible so that their diameters and numerical apertures can be made large. Further, for instance, their handling is easy and can be readily connected to light emitting and/or accepting elements. In general, a plastic optical fiber comprises a core made of a plastic material having a larger refractive index and a good optical transmission and a cladding made of a plastic material having a smaller refractive index and a high transparency. In this structure, light is transmitted by reflection at the interface between the core and the cladding. A larger difference in refractive index between the plastic materials of the core and of the cladding provides the optical fiber with better optical transmission. As the plastic materials having good optical transmission, amorphous plastics are preferred, examples of which are polymethyl methacrylate, polystyrene, etc. (cf. Japanese Patent Publication No. 8978/1968).

The plastic optical fiber, however, produces a huge decrease of optical transmission with an elevation of temperature and would accordingly, deteriorate the reliability of the fiber as a light signal-transmitting medium. In addition, it is insufficient in heat resistance so that its use in transporting vehicles such as automobiles, trains, vessels, aircrafts, robots, etc. is quire restricted. The maximum temperature at which plastic optical fibers made from polymethyl methacrylate and polystyrene can be used is about 80° C. When used at a temperature higher than about 80° C., these fibers become deformed and their microstructures become fluctuated; and the function thereof as a optical fiber is thus damaged. Once these fibers are used at a temperature higher than 80° C., the attenuation of light transmission is great even after cooling to room temperature, and these fibers can be used only within a very restricted temperature range. Accordingly, a plastic optical fiber having good heat resistance is highly desired.

Polymethyl methacrylate has a larger water absorption capability than polyolefins and polystyrene. For example, polymethyl methacrylate absorbs more than 2% by weight of water at a temperature of 100° C. and a relative humidity of 100% when measured according to ASTM D-570. When the material of the plastic optical fiber absorbs more than 1.8% by weight of water, it suffers dimensional change, warpage, or cracks which results from repeated cycles of wetting and drying. Thus, the use of a plastic optical fiber comprising polymethyl methacrylate is restricted in certain circumstances and/or application fields. Thus, improvement of the hygroscopic property of the plastic optical fiber is also desired.

Japanese Patent Kokai Publication (unexamined) No. 221808/1983 discloses a plastic optical fiber with good heat resistance and optical transmission comprising a core and a cladding, wherein the core is made of a polymer comprising units of a methacrylate ester the ester moiety of which has an alicyclic hydrocarbon of at least 8 carbon atoms, and the cladding is made of a transparent polymeric material having a refractive index of at least 3% smaller than that of the core. Some of the cladding materials used in the plastic optical fiber of the above publication is, however, desired to be improved in long-time heat resistance, humidity resistance and attenuation of light transmission although they have satisfactory short-time heat resistance.

SUMMARY OF THE INVENTION

One object of the present invention is to provide a plastic optical fiber having not only short-time heat and humidity resistance but also long-time heat and humidity resistance.

Another object of the present invention is to provide a plastic optical fiber having low attenuation of light transmission.

Further object of the present invention is to provide a plastic optical fiber having good adhesivity between the core and the cladding.

Accordingly, the present invention provides a plastic optical fiber comprising a core and a cladding, wherein the core is made a polymer comprising units of methyl methacrylate and of a methacrylate ester the ester moiety of which has an alicyclic hydrocarbon of 8 to 20 carbon atoms, and the cladding is made of a fluorine-containing polymer comprising units of the formula:

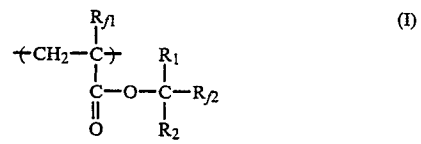

wherein $R_1$ and $R_2$ are each hydrogen or $C_1$–$C_3$ alkyl, $R_{f1}$ is fluorine or trifluoromethyl, and $R_{f2}$ is $C_2$–$C_{10}$ fluoroalkyl, which units (I) are derived from fluoroalkyl α-fluoroacrylate or trifluoromethacrylate.

DETAILED DESCRIPTION OF THE INVENTION

The polymer to be used for the core material is preferably a copolymer comprising at least 60% by mole of units of methyl methacrylate, units of a methacrylate ester the ester moiety of which has an alicyclic hydrocarbon of 8 to 20 carbon atoms and optionally units of other methacrylates (e.g. ethyl methacrylate, propyl methacrylate, butyl methacrylate, isobutyl methacrylate, cyclohexyl methacrylate, etc.). The copolymer may further comprise 10% by weight or less of an alkyl acrylate (e.g. methyl acrylate, ethyl acrylate and 2-ethylhexyl acrylate). Among these polymers, a copolymer comprising at least 70% by mole units of methyl methacrylate is preferred since it is highly pure and transparent and easily available.

The methacrylic ester, the ester moiety of which has an alicyclic hydrocarbon group of 8 to 20 carbon atoms may be prepared by esterifying methacrylic acid or its chloride with a monohydric alcohol of the formula: ROH wherein R is the above defined alicyclic hydrocarbon group. Specific examples of the monohydric alicyclic alcohol are 1-adamantanol, 2-adamantanol, 3-methyl-1-adamantanol, 3,5-dimethyl-1-adamantanol, 3-ethyladamantanol, 3-methyl-5-ethyl-1-adamantanol, 3,5,8-triethyl-1-adamantanol, 3,5-dimethyl-8-ethyl-1-adamantanol, octahydro-4,7-methanoinden-5-ol, octahydro-4,7-methanoinden-1-ylmethanol, p-menthanol-8, p-menthanol-2,3-hydroxy-2,6,6-trimethyl-bicyclo[3.1.1]heptane, 3,7,7-trimethyl-4-hydroxy-bicyclo[4.1.0]heptane, borneol, 2-methylcamphanol, fenchyl alcohol, l-menthol, 2,2,5-trimethylcyclohexanol, etc. The corresponding methacrylic esters of these monohydric alcohols are preferred.

Particularly preferred are bornyl methacrylate, fenchyl methacrylate, l-menthyl methacrylate, adamantyl methacrylate, dimethyladamantyl methacrylate, etc.

Preferably, the methacrylic ester, the ester moiety of which has an alicyclic hydrocarbon group of 8 to 20 carbon atoms is contained in the core material in an amount of 3 to 40% by weight of the total weight of the core material. When the amount of the methacrylic ester is less than 3% by weight, heat resistance is not sufficiently improved while the flexibility of the optical fiber is improved. When the amount is larger than 40% by weight, the flexibility of the optical fiber is deteriorated while the heat resistance is improved.

The fluorine-containing polymer comprising the units (I) derived from fluoroalkyl α-fluoroacrylate or trifluoromethacrylate preferably has a refractive index not larger than 1.43.

Specific examples of fluoroalkyl α-fluoroacrylate or trifluoromethacrylate are 1,1,1,3,3,3-hexafluoro-2-propyl α-fluoroacrylate, 1,1-diethyl-2,2,3,4,4,4-hexafluoro-1-butyl α-fluoroacrylate, 1-propyl-2,2,3,4,4,4-hexafluoro-1-butyl α-fluoroacrylate, 1,1-dimethyl-3-trifluoromethyl-2,2,4,4,4-pentafluorobutyl α-fluoroacrylate, 2-trifluoromethyl-2,2,3,3-tetrafluoropropyl α-fluoroacrylate, 2,2,3,3-tetrafluoropropyl α-fluoroacrylate, 1,1-dimethyl-2,2,3,3-tetrafluoropropyl α-fluoroacrylate, 2-trifluoromethyl-3,3,3-trifluoropropyl α-fluoroacrylate, and corresponding trifluoromethacrylates.

Among fluoroalkyl α-fluoroacrylate and trifluoromethacrylate, those in which $R_{f2}$ has 2 to 10 carbon atoms is selected, since the polymers thereof have good heat and humidity resistance and further the corresponding fluoroalcohols are characterized with having high purity are easily commercially available.

The polymers of fluoroalkyl α-fluoroacrylate and trifluoromethacrylate may comprise $C_1$-$C_4$ alkyl or fluoroalkyl acrylate, α-fluoroacrylate or methacrylate. In the present case, the refractive index of the copolymer is preferably not larger than 1.43.

The polymer to be used as the core material may be prepared by a conventional polymerization procedure such as suspension polymerization or bulk polymerization. In these preparation, a great care should be taken to prevent the contamination by the introduction of any foreign material into the produced polymer. For instance, the suspension polymerization usually requires the use of water and a suspension stabilizer in great amounts so that any foreign material contained therein tend to be included in the produced polymer. Any foreign material may also be introduced as a contaminant in the produced polymer during the operation of dehydration. For this reason, it is preferred to carry out polymerization in the air which has been cleaned to eliminate any floating material contained therein and to apply any cleaning or purification operation such as filtration, distillation and washing to the starting materials and/or the produced polymer.

In one of the preferred procedures for preparation of the plastic optical fiber of the present of invention, the production of the polymer for the core material which comprises continuous bulk polymerization at an elevated temperature with a subsequent continuous elimination of volatile materials containing unreacted monomers from the polymerization product, and the manufacture of the plastic optical fiber are carried out successively. In another preferred procedure, the polymer for the core material is produced by bulk polymerization, and subsequently the produced polymer and the polymeric material used as the cladding material are co-extruded to respectively formulate the core and the cladding as an integral body.

The polymerization may be initiated by the use of a radical initiator, examples of which are azo compounds (e.g. 2,2'-azobis(isobutyronitrile), 1,1'-azobis(cyclohexanecarbonitrile), 2,2'-azobis(2,4-dimethylvaleronitrile), azobisisobutanol diacetate and azo-t-butane), organic peroxides (e.g. di-t-butyl peroxide, dicumyl peroxide, methyl ethyl ketone peroxide, di-t-butyl perphthalate, di-t-butyl peracetate and di-t-amyl peroxide), etc. The amount of the initiator is preferably from 0.001 to 1% by mole of the monomer to be polymerized.

In order to control the molecular weight of the polymer, a chain transfer agent may be added to the polymerization system. Specific examples of the chain transfer agents are t-butylmercaptan, n-butylmercaptan, n-octylmercaptan, n-dodecylmercaptan, etc. The amount of the chain transfer agent is usually not more than 1 mol % of the total amount of monomer.

The production of the polymeric material for the cladding material may be also accomplished by a conventional polymerization procedure such as suspension or bulk polymerization. However, such a high level of care as taken in the preparation of the core material is not required since the presence of contamination in the cladding does not affect the light transmission as greatly as in case of the core. Usually, the monomer of the cladding material is filtrated before polymerization to remove foreign materials.

The weight ratio of the core material and the cladding material is from about 70:30 to 98:2, preferably from about 80:20 to 95:5. The plastic optical fiber of the present invention usually has a diameter of from about 0.15 mm to 1.5 mm, preferably from about 0.20 to 1.0 mm.

The plastic optical fiber of the present invention comprises a core of a specific polymer and a cladding of a specific polymeric material so that it can be used in a temperature range which is wider than the range of conventional plastic optical fiber and has excellent heat and humidity resistance.

Since the plastic optical fiber is stable even at a high temperature of over 110° C., it can be applied to automobiles, vessels, aircrafts, robots, etc. Further, it will have a wide application in communication in premises or building since it can be used in wider temperature and/or humidity ranges.

Practical and presently preferred embodiments of the present invention are shown in the following Examples wherein the parts and percentages are by weight unless otherwise indicated.

In these examples, the attenuation of light transmission was measured as follows:

As the illuminant, a halogen-tungsten lamp was employed. Using a diffraction grating spectrophotometer, the intensities of the outputs from the optical fiber to be tested and from the standard optical fiber at a wavelength of 650 nm were read off by means of silicone photodiode. The attenuation of light transmission (A) was calculated according to the following equation:

$$A \text{ (dB/Km)} = \frac{10}{L} \log\left(\frac{I}{I_o}\right)$$

wherein L is the length of the optical fiber (Km), $I_o$ is the intensity of light at the entrance and I is the intensity of light at the exit.

The heat resistance of the plastic optical fiber was evaluated by heating the plastic optical fiber at a predetermined temperature for a predetermined period of time and comparing the optical transmission loss before and after heating.

The humidity resistance of the plastic optical fiber was tested by immersing it in a constant temperature bath kept at a predetermined temperature for 24 hours, and comparing attenuation of light transmission measured before and after the water treatment. The measurement of attenuation of light transmission after the water treatment was completed within 30 minutes.

Water absorption of the plastic optical fiber was measured according to ASTM D-570.

EXAMPLE 1

A monomeric mixture of bornyl methacrylate purified by distillation under reduced pressure (25 parts), methyl methacrylate (72 parts) and methyl acrylate (3 parts) containing n-dodecylmercaptan (0.025 part) and 2,2'-azobis(2,4-dimethylvaleronitrile) (0.10 part) was prepared in the absence of oxygen, charged in a reactor kept at 150° C. and subjected to prepolymerization with a retention time of 8 hours. The prepolymerized mixture was then introduced into a screw conveyor kept at 200° C. and polymerized with a retention time of 2 hours to obtain a copolymer. Intrinsic viscosity [$\eta$] (25° C., chloroform), 0.90. Refractive idex, 1.49.

The thus produced polymer was charged in a vented extruder kept at 235° C. The polymer was extruded from the central portion of a coextruder die kept at 225° C. to form a strand of 1 mm in diameter as a core, while 2,2,3,3-tetrafluoropropyl α-fluoroacrylate, methyl methacrylate and methyl acrylate terpolymer (weight ratio of 88:10:2; refractive index, 1.41; melt index, 28 g/10 min. (ASTM D-1238-57T, load of 325 g, 200° C.)) was melt coated on the surface of the core strand to form a strand in a core-cladding structure. The thickness of the cladding was 10 micrometers.

The attenuation of light transmission at wavelength of 650 nm as measured at 25° C. was 210 dB/Km. The attenuations at wavelength of 650 nm after heated for 120 hours at 120° C. was 220 dB/Km. Further, after humidity resistance test under conditions of relative humidity of 90% and a temperature of 50° C., attenuations at the same wavelength was 220 dB/Km.

EXAMPLES 2 TO 4

In the same manner as in Example 1 but using polymers as shown in Table 1, plastic optical fibers of from 0.85 to 0.75 mm in diameter were prepared. Their attenuations of light transmission before and after heating and their water absorbance are shown in Table 1.

TABLE 1

| Example No. | Polymer for core | | Polymeric material for cladding | | | Attenuation of light transmission (dB/Km) (650 nm) | | Water absorbance (%) |
|---|---|---|---|---|---|---|---|---|
| | Monomers (%) | [$\eta$] (25° C., CHCl$_3$) | Monomers (%) | Melt Viscosity (poise) (°C.) | Refractive index (20° C.) | Room temp. | After heating | |
| 2 | Bornyl methacrylate/ Methyl methacrylate/ Methyl acrylate (20:78:2) | 0.80 | 2,2,3,3-Pentafluoropropyl α-fluoroacrylate/ Methyl α-fluoroacrylate/ Methyl acrylate (58:40:2) | 4 × 10$^4$ (230) | 1.41 | 190 | 190 (110° C. × 24 hrs.) | 0.7 |
| 3 | Fenchyl methacrylate/ Methyl methacrylate/ Methyl acrylate (15:83:2) | 0.96 | 2,2,3,3-Tetrafluoropropyl α-fluoroacrylate/ Butyl acrylate (96:4) | 5 × 10$^4$ (220) | 1.40 | 240 | 240 (110° C. × 24 hrs.) | 0.4 |
| 4 | l-Menthyl methacrylate/ Methyl methacrylate/ Methyl acrylate (40:58:2) | 0.60 | 2-Trifluoromethyl-3,3,3-trifluoropropyl trifluoromethacrylate/ Methyl acrylate (97:3) | [$\eta$]*$^1$ 0.70 | 1.38 | 260 | 260 (120° C. × 24 hrs.) | 0.4 |

Note
*$^1$At 25° C. in ethyl acetate.

COMPARATIVE EXAMPLE 1

In the same manner as in Example 1 but using, as a cladding material, a copolymer of 2,2,3,3-tetrafluoropropyl methacrylate and methyl acrylate (Weight ratio, 95:5. Refractive index, 1.40. [$\eta$] (25° C., ethyl acetate), 0.78), an optical fiber of 0.80 mm in diameter was prepared. Attenuation of light transmission at wavelength of 650 nm as measured at 25° C. was 200 dB/km. After heating at 90° C. for 24 hours, it was 540 dB/km, and after the humidity resistance test, it was 240 dB/km.

COMPARATIVE EXAMPLE 2

In the same manner as in Example 1 but using, as the core material, a copolymer of methyl methacrylate and methyl acrylate (Weight ratio, 97:3. Melt index, 7.0 g/10 min.) and as a cladding material, the same copolymer as used in Comparative Example 1, an optical fiber of 0.80 mm in diameter was prepared. Attenuation of light transmission at wavelength of 650 nm as measured at 25° C. was 190 dB/km. After heating at 90° C. for 6 hours, it was 1,000 dB/km. Water absorption was 1.4%.

What is claimed is:

1. A plastic optical fiber comprising a core and a cladding, wherein the core is made of a polymer comprising units of methyl methacrylate and units of a methacrylate ester, the ester moiety of which has an alicyclic hydrocarbon of from 8 to 20 carbon atoms, and the cladding is made of a fluorinecontaining polymer comprising units of the formula:

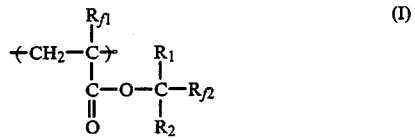

wherein $R_1$ and $R_2$ are each hydrogen or $C_1$–$C_3$ alkyl, $R_{f1}$ is fluorine or trifluoromethyl, and $R_{f2}$ is $C_2$–$C_{10}$ fluoroalkyl, which units (I) are derived from fluoroalkyl α-fluoroacrylate or trifluoromethacrylate.

2. The plastic optical fiber according to claim 1, wherein the methacrylate ester, the ester moiety of which has an alicyclic hydrocarbon from 8 to 20 carbon atoms is selected from the group consisting of bornyl methacrylate, fenchyl methacrylate, l-menthyl methacrylate, adamantyl methacrylate and dimethyladamantyl methacrylate.

3. The plastic optical fiber according to claim 1, wherein the core polymer comprises at least 70% by weight of methyl methacrylate units.

4. The plastic optical fiber according to claim 1, wherein the core polymer contains 3 to 40% by weight of the methacrylate ester, the ester moiety of which has an alicyclic hydrocarbon of from 8 to 20 carbon atoms based on the total weight of the core.

5. The plastic optical fiber according to claim 1, wherein α-fluoroacrylate or trifluoromethacrylate is selected from the group consisting of 1,1,1,3,3,3-hexafluoro-2-propyl α-fluoroacrylate, 1,1-diethyl-2,2,3,4,4,4-hexafluoro-1-butyl α-fluoroacrylate, 1-propyl-2,2,3,4,4,4-hexafluoro-1-butyl α-fluoroacrylate, 1,1-dimethyl-3-trifluoromethyl-2,2,4,4,4-pentafluorobutyl α-fluoroacrylate, 2-trifluoromethyl-2,2,3,3-tetrafluoropropyl α-fluoroacrylate, 2,2,3,3-tetrafluoropropyl α-fluoroacrylate, 1,1-dimethyl-2,2,3,3-tetrafluoropropyl α-fluoroacrylate, 2-trifluoromethyl-3,3,3-trifluoropropyl α-fluoroacrylate, and corresponding trifluoromethacrylates.

6. The plastic optical fiber according to claim 1, wherein the polymer of α-fluoroacrylate or trifluoromethacrylate has a refractive index not larger than 1.43.

7. The plastic optical fiber according to claim 1, wherein the core polymer comprises up to 10% by weight of an alkyl acrylate.

8. The plastic optical fiber according to claim 7, wherein the alkyl acrylate is methyl acrylate, ethyl acrylate or 2-ethylhexyl acrylate.

9. The plastic optical fiber according to claim 1, having a core and cladding ratio of from 70:30 to 98:2.

10. The plastic optical fiber according to claim 9, wherein the ratio is from 80:20 to 95:5.

11. The plastic optical fiber according to claim 1 having a diameter of from about 0.15 mm to 1.5 mm.

12. The plastic optical fiber according to claim 11, wherein the diameter is from about 0.20 to 1.0 mm.

13. The plastic optical fiber according to claim 1, wherein the plastic optical fiber is produced by co-extruding the core and the cladding.

* * * * *